US012549418B2

(12) United States Patent
Yeung

(10) Patent No.: US 12,549,418 B2
(45) Date of Patent: Feb. 10, 2026

(54) LINEAR REDRIVER WITH TUNABLE LOW FREQUENCY AND HIGH FREQUENCY ZERO AT EQUALIZER STAGE

(71) Applicant: Diodes Incorporated, Plano, TX (US)

(72) Inventor: Tony Yeung, Milpitas, CA (US)

(73) Assignee: DIODES INCORPORATED, Plano, TX (US)

( * ) Notice: Subject to any disclaimer, the term of this patent is extended or adjusted under 35 U.S.C. 154(b) by 0 days.

(21) Appl. No.: 18/631,996

(22) Filed: Apr. 10, 2024

(65) Prior Publication Data
US 2025/0323811 A1 Oct. 16, 2025

(51) Int. Cl.
*H04L 25/03* (2006.01)
*H04L 25/02* (2006.01)

(52) U.S. Cl.
CPC .... *H04L 25/03878* (2013.01); *H04L 25/0278* (2013.01); *H04L 25/028* (2013.01)

(58) Field of Classification Search
CPC ........... H04L 25/03878; H04L 25/0278; H04L 25/028
See application file for complete search history.

(56) References Cited

U.S. PATENT DOCUMENTS

| 8,335,249 | B1 * | 12/2012 | Su ........................ H03F 3/45197 375/232 |
|---|---|---|---|
| 11,296,667 | B1 | 4/2022 | Delshadpour |
| 11,349,463 | B2 * | 5/2022 | Delshadpour ..... H04L 25/03878 |
| 2018/0351524 | A1 * | 12/2018 | Nagulapalli ............ H03F 3/193 |
| 2020/0083854 | A1 * | 3/2020 | Tajalli ..................... H03F 1/301 |
| 2020/0257354 | A1 | 8/2020 | Vining et al. |
| 2022/0140821 | A1 | 5/2022 | Delshadpour et al. |

OTHER PUBLICATIONS

International Search Report and Written Opinion for Application No. PCT/US2025/021642, mailed on Jun. 20, 2025, 15 pages.

\* cited by examiner

*Primary Examiner* — Freshteh N Aghdam
(74) *Attorney, Agent, or Firm* — Kilpatrick Townsend & Stockton LLP

(57) ABSTRACT

An equalizer stage circuit includes a first transistor and a second transistor disposed in a differential configuration. The equalizer stage circuit also includes a first selectable path. The first selectable path includes: a first terminal coupled to an emitter or a source of the first transistor; a second terminal coupled to an emitter or a source of the second transistor; a high-frequency portion comprising a first plurality of high-frequency RC time constant members connected in parallel between the first terminal and the second terminal; a first capacitor coupled to the first terminal; a second capacitor coupled to the second terminal; and a low-frequency portion comprising a second plurality of low-frequency RC time constant members connected between the first capacitor and the second capacitor.

20 Claims, 7 Drawing Sheets

LINEAR REDRIVER WITH TUNABLE LOW FREQUENCY AND HIGH FREQUENCY ZERO AT EQUALIZER STAGE

BACKGROUND OF THE INVENTION

As a signal travels through a cable or circuit board, it loses strength due to a variety of factors including resistance and capacitance. Signal weakening can distort the signal and make it harder to be read and process at the receiving end. A linear redriver is a microchip that improves the signal integrity of high-speed interfaces (e.g., high-speed data links). A linear redriver is particularly useful for extending the reach of a signal by counteracting signal weakening caused by factors such as cable length or imperfections in the circuit board. A linear redriver typically includes a continuous time linear equalizer (CTLE) to selectively boost the high-frequency components of the signal, which are most susceptible to signal weakening. Unlike some other signal conditioners, a linear redriver does not alter the fundamental characteristics of the signal. Instead, a linear redriver amplifies the weakened components while leaving the original signal shape intact. Preserving signal characteristics is particularly beneficial for high-speed interfaces, which rely on specific signal characteristics for proper functionality.

Despite the progress made in the area of linear redrivers, there is a need in the art to improve the signal quality provided by a linear redriver.

SUMMARY OF THE INVENTION

The present disclosure generally relates to electronic circuits and equalizers. More particularly, embodiments of the present invention provide an equalizer stage circuit of a linear redriver that is able to achieve variation in equalizer gain. The embodiments described herein are applicable to a broad range of linear redrivers and electronics.

One general aspect includes an equalizer stage circuit. The equalizer stage circuit includes a first transistor. The equalizer stage circuit also includes a second transistor, and the first transistor and the second transistor are disposed in a differential configuration. The equalizer stage circuit also includes a first selectable path. The first selectable path includes: a first terminal coupled to an emitter or a source of the first transistor; a second terminal coupled to an emitter or a source of the second transistor; a high-frequency portion comprising a first plurality of high-frequency RC time constant members connected in parallel between the first terminal and the second terminal; a first capacitor coupled to the first terminal; a second capacitor coupled to the second terminal; and a low-frequency portion comprising a second plurality of low-frequency RC time constant members connected between the first capacitor and the second capacitor.

Implementations may include one or more of the following features. In some embodiments, each of the first plurality of high-frequency RC time constant members is selectively coupled between the first terminal and the second terminal based on a first set of control signals. In some embodiments, the high-frequency portion is characterized by a first varying impedance based on the first set of control signals. In some embodiments, the first varying impedance determines a position of a high-frequency zero of a transfer function.

In some embodiments, each of the second plurality of low-frequency RC time constant members is selectively coupled between the first capacitor and the second capacitor based on a second set of control signals. In some embodiments, the low-frequency portion is characterized by a second varying impedance based on the second set of control signals. In some embodiments, the second varying impedance determines a position of a low-frequency zero of a transfer function.

In some embodiments, each of the second plurality of low-frequency RC time constant members includes: a first resistor connected to the first capacitor; a second resistor connected to the second capacitor; a first access transistor connected between the first resistor and a ground; and a second access transistor connected between the second resistor and the ground. In some embodiments, the equalizer stage circuit further includes a control unit configured to apply the second set of control signals to a gate of the first access transistor and a gate of the second access transistor of the second plurality of low-frequency RC time constant members.

In some embodiments, the equalizer stage circuit further includes a second selectable path. The second selectable path includes: a third terminal coupled to a collector or a drain of the first transistor; a fourth terminal coupled to a collector or a drain of the second transistor; and a third plurality of high-frequency RC time constant members connected between the third terminal and the fourth terminal. In some embodiments, each of the third plurality of high-frequency RC time constant members is selectively coupled between the third terminal and the fourth terminal based on a third set of control signals. In some embodiments, the second selectable path is characterized by a third varying impedance based on the third set of control signals. In some embodiments, the third varying impedance determines a position of a high-frequency pole of a transfer function.

Another general aspect includes a linear redriver coupled between a transmitter and a receiver. The linear redriver includes: an input stage circuit coupled to the transmitter; an output stage circuit coupled to the receiver; and an equalizer stage circuit coupled between the input stage circuit and the output stage circuit. The equalizer stage circuit includes a first transistor. The equalizer stage circuit also includes a second transistor, and the first transistor and the second transistor are disposed in a differential configuration. The equalizer stage circuit also includes a first selectable path. The first selectable path includes: a first terminal coupled to an emitter or a source of the first transistor; a second terminal coupled to an emitter or a source of the second transistor; a high-frequency portion comprising a first plurality of high-frequency RC time constant members connected in parallel between the first terminal and the second terminal; a first capacitor coupled to the first terminal; a second capacitor coupled to the second terminal; and a low-frequency portion comprising a second plurality of low-frequency RC time constant members connected between the first capacitor and the second capacitor.

Numerous benefits are achieved by way of the present disclosure over conventional techniques. For example, embodiments of the present invention provide improved matching of trace loss compared to conventional approaches. Moreover, embodiments of the present invention described more fully herein provide fine-tuning of the gain profiles and allow for latitude to achieve a relatively wide gain range at a desired frequency or a desired frequency band. These and other embodiments of the disclosure, along with many of its advantages and features, are described in more detail in conjunction with the text below and corresponding figures.

DETAILED DESCRIPTION OF THE INVENTION

The present disclosure generally relates to electronic circuits and equalizers. More particularly, embodiments of the present invention provide an equalizer stage circuit of a linear redriver that is able to achieve variation in equalizer gain. The embodiments described herein are applicable to a broad range of linear redrivers and electronics.

An equalizer (sometimes also referred to as an "equalizer stage") of a linear redriver is often used to compensate for insertion loss due to, for example, high-frequency loss of printed circuit board (PCB) traces or the skin effect of transmission lines. An equalizer is usually implemented using active devices, such as bipolar junction transistors (BJTs) and complementary metal oxide semiconductor (CMOS) devices. Poles and zeros of the transfer function are created accordingly. A value that causes the numerator of the transfer function to be zero is called a "zero" of the transfer function, while a value that causes the denominator of the transfer function to be zero is called a "pole" of the transfer function. Zeros of the transfer function are usually created to achieve a desired gain. High-frequency zeros are created to compensate the high-frequency loss of PCB. Low-frequency zeros can also be added to further improve the degree of control to match the PCB low-frequency loss characteristics. A usual implementation of creating zeros of the transfer function is through a path coupled to the source/emitter terminal of the active device (typically in a differential pair configuration). The path is characterized by a selectable capacitance value selected from a variety of capacitance values. As a result, the gain of the equalizer is changed accordingly.

It has been appreciated by the inventor that low-frequency zero variations can be added, in addition to high-frequency zero variations, to achieve variation in the gain of the equalizer at the low-frequency region, thereby achieving a better match of the insertion loss profile of the input traces before the redriver. Examples of these techniques are discussed below with reference to FIGS. 1-5. These examples are, however, not intended to be limiting, and one of ordinary skill in the art would recognize many variations, modifications, and alternatives.

Figure 1:
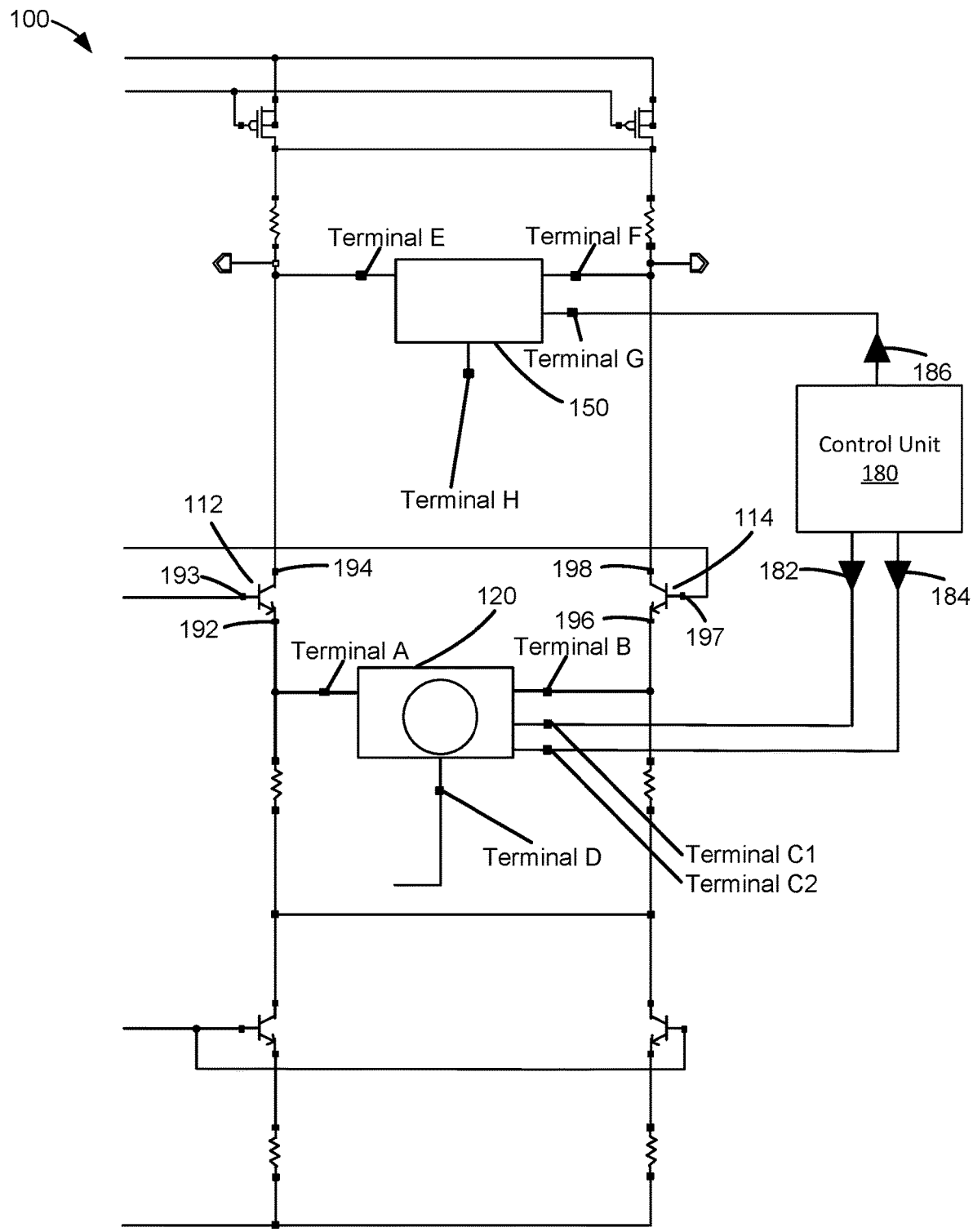
FIG. 1 shows an equalizer stage circuit with selectable paths at source/emitter and drain/collector for variation in the high-frequency zeros and low-frequency zeros according to an embodiment of the present invention.

FIG. 1 shows an equalizer stage circuit with selectable paths at source/emitter and drain/collector for variation in the high-frequency zeros and low-frequency zeros according to an embodiment of the present invention. In the example shown in FIG. 1, the equalizer stage circuit 100 includes, among other components, a first transistor 112, a second transistor 114, and a selectable path 120. In the embodiment shown in FIG. 1, the first transistor 112 and the second transistor 114 are BJTs. In other embodiments, the first transistor 112 and the second transistor 114 may be other types of transistors, such as metal-oxide-semiconductor field effect transistors (MOSFETs). The first transistor 112 and the second transistor 114 are disposed in a differential configuration.

In some embodiments, the equalizer stage circuit 100 may further include a control unit 180 configured to provide various control signals, which will be discussed in greater detail below with reference to FIGS. 2A-3. In some implementations, the control unit 180 is a component included in the equalizer stage circuit 100. In other implementations, the control unit 180 is outside the equalizer stage circuit 100 and a portion of the linear redriver that includes the equalizer stage circuit 100. One of ordinary skill in the art would recognize many variations, modifications, and alternatives.

The selectable path 120 is coupled between the emitter 192 of the first transistor 112 and the emitter 196 of the second transistor 114. Accordingly, the selectable path 120 may be referred to as the "emitter-side selectable path" or the "source-side selectable path," depending on the device types of the first transistor 112 and the second transistor 114. The selectable path 120 may also be referred to as the "transfer function zero selectable path," as compared to the "transfer function pole selectable path" discussed below with reference to FIG. 3.

A first terminal ("terminal A" shown in FIG. 1) is coupled to the emitter 192 of the first transistor 112 and a second terminal ("terminal B" shown in FIG. 1) is coupled to the emitter 196 of the second transistor 114. A third terminal ("terminal C-1" shown in FIG. 1) is coupled to the control unit 180 to receive control signals 182 that control the high-frequency zero portion 122 discussed below. A fourth terminal ("terminal C-2" shown in FIG. 1) is coupled to the control unit 180 to receive control signals 184 that control the low-frequency zero portion 124 discussed below. A fifth terminal ("terminal D" shown in FIG. 1) is coupled to a lower power rail (e.g., the ground). Although only one line between the terminal C-1 and the control unit 180 is symbolically illustrated in FIG. 1, it should be understood that multiple lines may be employed to deliver multiple control signals 182, respectively. As will be discussed below with reference to FIG. 2A, each of the multiple control signals 182 corresponds to one RC time constant member 132 of the high-frequency zero portion 122. Likewise, although only one line between the terminal C-2 and the control unit 180 is symbolically illustrated in FIG. 1, it should be understood that multiple lines may be employed to deliver multiple control signals 184, respectively. As will be discussed below with reference to FIG. 2A, each of the multiple control signals 184 corresponds to one RC time constant member 134 of the low-frequency zero portion 124. One of ordinary skill in the art would recognize many variations, modifications, and alternatives.

As will be discussed in greater detail below with reference to FIGS. 2A-2C, the selectable path 120 includes a high-frequency zero portion 122 and a low-frequency zero portion 124 coupled together. Under the control of digital control signals 182 and 184, RC time constant members 132 of the high-frequency zero portion 122 and RC time constant members 134 of the low-frequency zero portion 124 are selectively coupled between the emitter 192 of the first transistor 112 and the emitter 196 of the second transistor 114. The user may set the control signals 182 and 184 applied to the terminals C-1 and C-2, respectively, either through an external pin control mechanism or an I²C control bus. The user may tune the control signals 182 and 184 applied to the terminals C-1 and C-2, according to the system or device being built, to adapt for the specific insertion loss or input traces when building a particular system or device. The control signals 182 and 184 are usually fixed after the initialization process of the system or device unless the loss profile changes considerably.

Figure 2A:
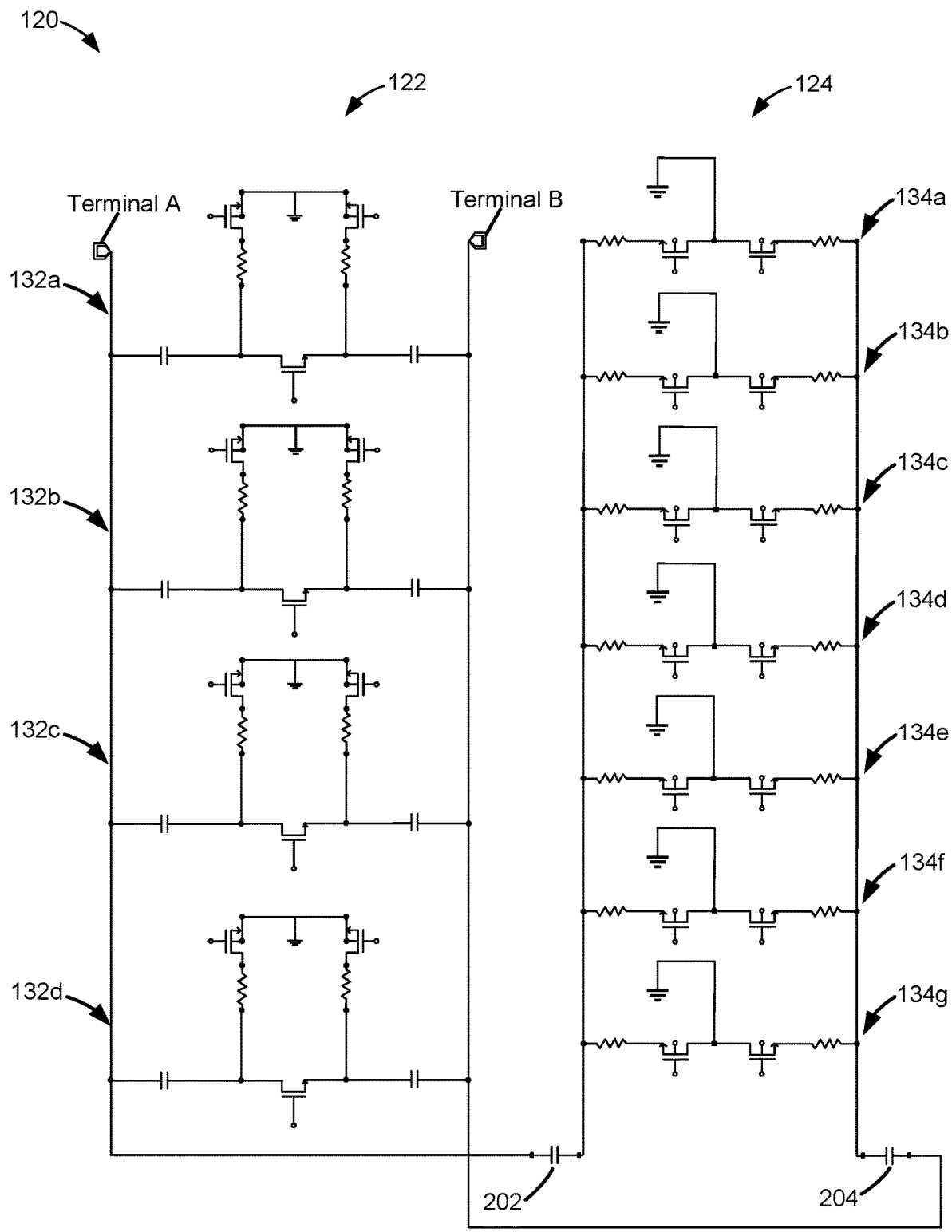
FIG. 2A shows the selectable path 120 shown in FIG. 1 at the source/emitter side for variation in the high-frequency zeros and the low-frequency zeros according to an embodiment of the present invention.

FIG. 2A shows the selectable path 120 shown in FIG. 1 at the source/emitter side for variation in the high-frequency zeros and the low-frequency zeros according to an embodiment of the present invention. As mentioned above, the selectable path 120 includes, among other components, the high-frequency zero portion 122 and the low-frequency zero portion 124. The low-frequency zero portion 124 is coupled to the high-frequency zero portion 122 through a first capacitor 202 and a second capacitor 204.

The high-frequency zero portion 122 includes a first number (e.g., four in this example shown in FIG. 2A) of RC time constant members 132a, 132b, 132c, and 132d (collectively, 132) connected in parallel between the terminal A and the terminal B. The detailed structure of a single RC time constant member 132 of the high-frequency zero portion 122 is shown in FIG. 2B.

Figure 2B:
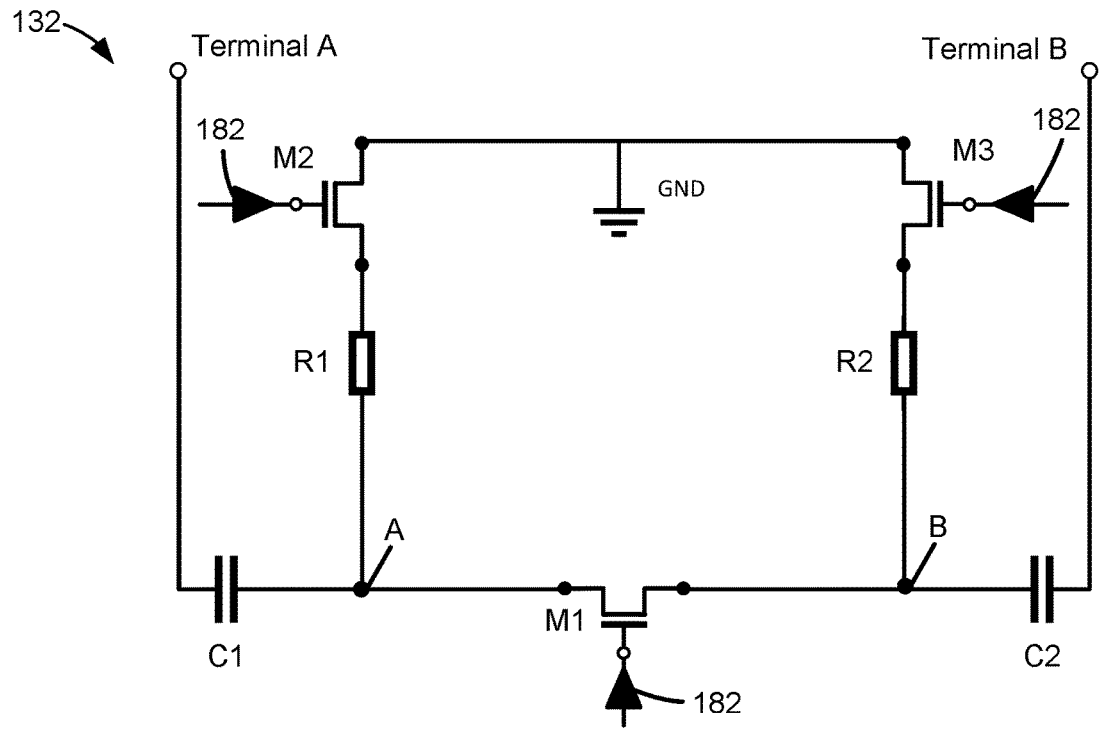
FIG. 2B shows a single RC time constant member of the high-frequency zero portion according to an embodiment of the present invention.

FIG. 2B shows a single RC time constant member 132 of the high-frequency zero portion 122 according to an embodiment of the present invention. In the example shown in FIG. 2B, the RC time constant member 132 includes a capacitor C1, a capacitor C2, a resistor R1, a resistor R2, a first access transistor M1, a second access transistor M2, and a third access transistor M3 connected in the manner shown in FIG. 2B. The first access transistor M1 is connected in series between the capacitor C1 and the capacitor C2. The capacitor C1 is coupled to the terminal A, and the capacitor C2 is coupled to the terminal B. When the first access transistor M1 is turned on, the capacitor C1 and the capacitor C2 are connected in series between the terminal A and the terminal B.

The resistor R1 is connected in series with the second access transistor M2 between the node A and the ground. The resistor R2 is connected in series with the third access transistor M3 between the node B and the ground. When the second access transistor M2 is turned on, the resistor R1 is connected between the node A and the ground. When the third access transistor M3 is turned on, the resistor R2 is connected between the node A and the ground. In short, the control signals 182 enable the turning on of the first access transistor M1, the second access transistor M2, and the third access transistor M3, thereby selectively coupling the corresponding RC time constant member 132 between the terminal A and the terminal B.

As such, by way of the control signals 182 applied to the gates of the first access transistor M1, the second access transistor M2, and the third access transistor M3, the RC time constant member 132 is selectively coupled between the terminal A and the terminal B. The RC time constant member 132 is characterized by an RC time constant and a corresponding impedance determined by the capacitance values of the capacitors C1 and C2 and the resistance values of the resistors R1 and R2. By tuning the capacitance values and the resistance values, each RC time constant member may provide a desired RC time constant and a desired impedance, thereby adjusting the positions of the high-frequency zeros. In one example, the gates of the first access transistor M1, the second access transistor M2, and the third access transistor M3 are connected together to receive the same control signal.

In one embodiment, one or more of the RC time constant members 132 is selected at a certain time. In other embodiments, only one of the RC time constant members 132 is selected at a certain time. One of ordinary skill in the art would recognize many variations, modifications, and alternatives.

The low-frequency zero portion 124 includes a second number (e.g., seven in the example shown in FIG. 2A) of RC time constant members 134a, 134b, 134c, 134d, 134e, 134f, and 134g (collectively, 134) connected in parallel between the terminal A and the terminal B through the first capacitor 202 and the second capacitor 204. The detailed structure of a single RC time constant member 134 of the low-frequency zero portion 124 is shown in FIG. 2C.

Figure 2C:
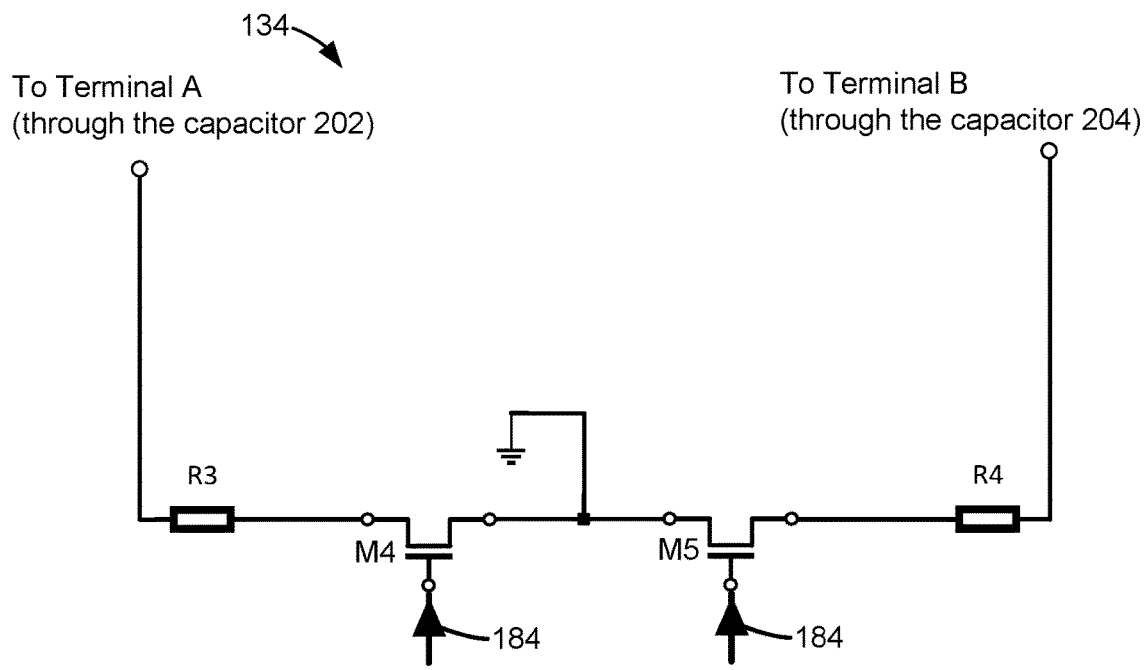
FIG. 2C shows a single RC time constant member of the low-frequency zero portion according to an embodiment of the present invention.

FIG. 2C shows a single RC time constant member 134 of the low-frequency zero portion 124 according to an embodiment of the present invention. In the example shown in FIG. 2C, the RC time constant member 134 includes a resistor R3, a resistor R4, a fourth access resistor M4, and a fifth access resistor M5 connected in the manner shown in FIG. 2C. The resistor R3 is connected between the first capacitor 202 and the fourth access transistor M4; the resistor R4 is connected between the second capacitor 204 and the fifth access transistor M5. The fourth access transistor M4 is connected between the resistor R3 and the ground, and the fifth access transistor M5 is connected between the resistor R4 and the ground. When the fourth access transistor M4 and the fifth access transistor M5 are turned on, the resistor R3 is connected between the terminal A (through the first capacitor 202) and the ground, and the resistor R4 is connected between the terminal B (through the second capacitor 204).

As such, by way of the control signals 184 applied to the gates of the fourth access transistor M4 and the fifth access transistor M5, the RC time constant member 134 is selectively coupled between the terminal A and the terminal B. The RC time constant member 134, in conjunction with the first capacitor 202 and the second capacitor 204, determines the RC time constant and the impedance of the low-frequency zero portion 124. By tuning the resistance values of the resistors R3 and R4 and the capacitance values of the first capacitor 202 and the second capacitor 204, each RC time constant member 134 may provide a desired RC time constant and a desired impedance, thereby adjusting the positions of the low-frequency zeros. The introduction of the RC time constant members 134 of the low-frequency zero portion 124, in addition to the high-frequency zero portion 122, facilitates further tweaking the gain curve of the equalizer. In one example, the gates of the fourth access transistor M4 and the fifth access transistor M5 are connected together to receive the same control signal.

In one embodiment, only one of the RC time constant members 134 is selected at a certain time. In other embodiments, one or more of the RC time constant members 132 is selected at a certain time. A desired number of the RC time constant members 132 can be selected to achieve the desired impedance of the low-frequency zero portion 124. One of ordinary skill in the art would recognize many variations, modifications, and alternatives.

Referring back to FIG. 1, in some embodiments, the equalizer stage circuit 100 further includes a selectable path 150. The selectable path 150 is coupled between the collector 194 of the first transistor 112 and the collector 198 of the second transistor 114. Accordingly, the selectable path 150 may be referred to as the "collector-side selectable path" or the "drain-side selectable path," depending on the device types of the first transistor 112 and the second transistor 114. The selectable path 150 may also be referred to as the "transfer function pole selectable path," as compared to the "transfer function zero selectable path" discussed above with reference to FIG. 2A.

A first terminal ("terminal E" shown in FIG. 1) is coupled to the collector 194 of the first transistor 112; a second terminal ("terminal F" shown in FIG. 1) is coupled to the collector 198 of the second transistor 114. A third terminal ("terminal G" shown in FIG. 1) is coupled to the control unit 180 to receive control signals 186 that control the selection of the RC time constant member 162 discussed below. A fourth terminal ("terminal H" shown in FIG. 1) is coupled to a lower power rail (e.g., the ground). Although only one line between the terminal G and the control unit 180 is symbolically illustrated in FIG. 1, it should be understood that multiple lines may be employed to deliver multiple control signals 186, respectively. As will be discussed below with reference to FIG. 3, each of the multiple control signals 186 corresponds to one RC time constant member 162 discussed below. One of ordinary skill in the art would recognize many variations, modifications, and alternatives.

Similarly, the user may set the control signals 186 applied to the terminal G either through an external pin control mechanism or an $I^2C$ control bus. The user may tune the control signals 186, according to the particular system or device being built, to adapt for the specific insertion loss or input traces when building a particular system or device. The control signals 186 are usually fixed after the initialization process of the system or device unless the insertion loss or input traces change considerably.

Figure 3:
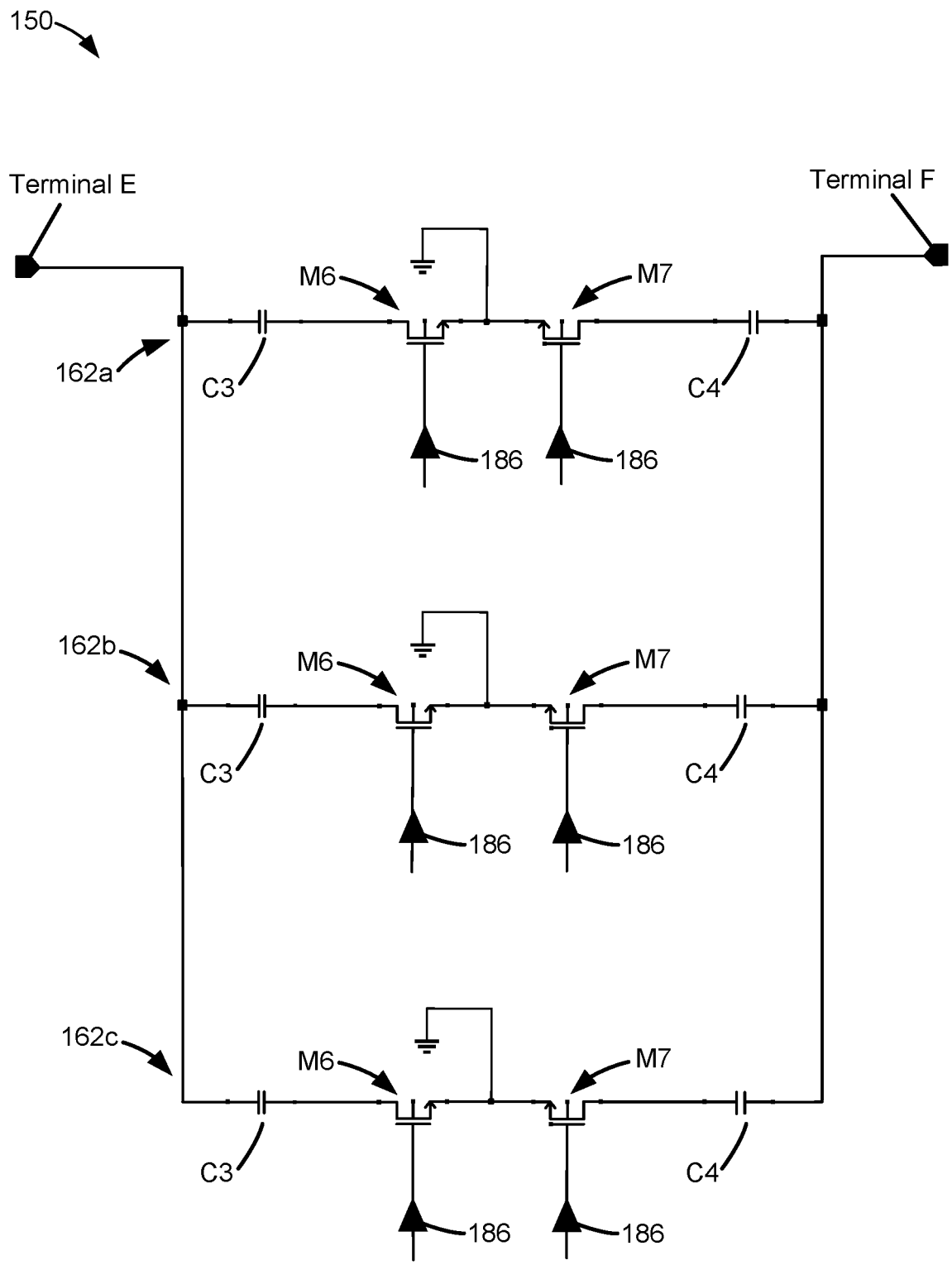
FIG. 3 shows the selectable path 150 shown in FIG. 1 at the drain/collector side for variation in the high-frequency poles according to an embodiment of the present invention.

FIG. 3 shows the selectable path 150 shown in FIG. 1 at the drain/collector side for variation in the high-frequency poles according to an embodiment of the present invention. The selectable path 150 includes, among other components, a third number (e.g., three in this example shown in FIG. 3) of RC time constant members 162a, 162b, and 162c (collectively, 162) connected in parallel between the terminal E and the terminal F. Each RC time constant member 162 of the selectable path 150 includes a capacitor C3, a capacitor C4, a sixth access transistor M6, and a seventh access transistor M7 connected in the manner shown in FIG. 3.

The capacitor C3 is connected between the terminal E and the sixth access transistor M6, and the capacitor C4 is connected between the terminal F and the seventh access transistor M7. The sixth access transistor M6 is connected between the capacitor C3 and the ground, and the seventh access transistor M7 is connected between the capacitor C4 and the ground. When the sixth access transistor M6 and the seventh access transistor M7 are turned on, the capacitor C3 is connected between the terminal E and the ground, and the capacitor C4 is connected between the terminal F and the ground.

Likewise, by way of the control signals 186 applied to the gates of the sixth access transistor M6 and the seventh access transistor M7, the RC time constant member 162 is selectively coupled between the terminal E and the terminal F. The RC time constant member 162 determines the RC time constant and the impedance of the selectable path 150. By tuning the capacitance values of the capacitors C3 and C4, each RC time constant member 162 may provide a desired RC time constant and a desired impedance, thereby adjusting the positions of the high-frequency poles. As will be discussed below with reference to FIGS. 4 and 5, adjusting the positions of the high-frequency poles can facilitate the fine-tuning of the gain curve in the low-frequency region. In one example, the gates of the sixth access transistor M6 and the seventh access transistor M7 are connected together to receive the same control signal.

Figure 4:
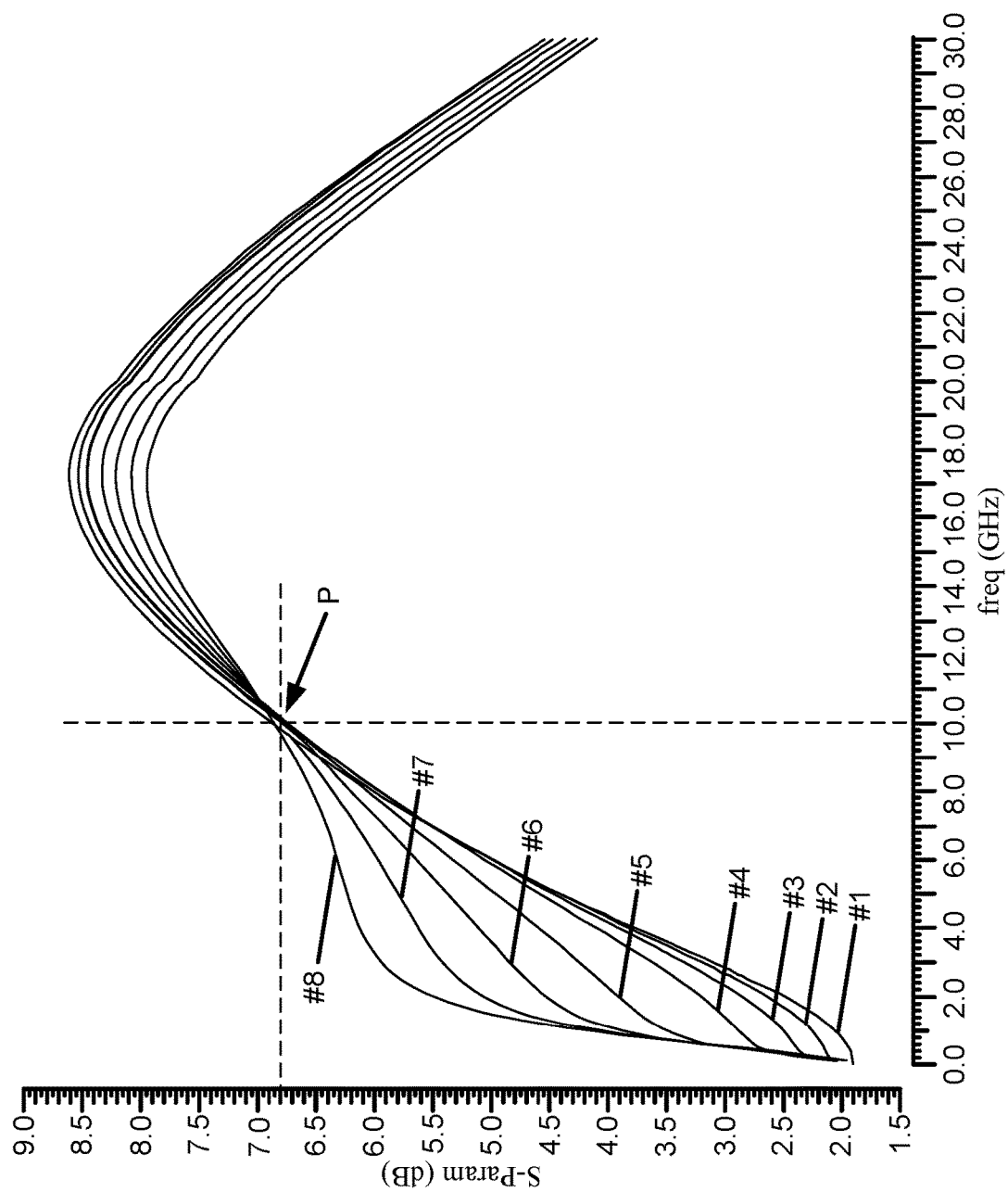
FIG. 4 shows the simulation of equalizer gain versus frequency with fixed high-frequency zeros and variation in low-frequency zeros according to an embodiment of the present invention.

FIG. 4 shows the simulation of equalizer gain versus frequency with fixed high-frequency zeros and variation in low-frequency zeros according to an embodiment of the present invention. As shown in FIG. 4, eight gain curves (i.e., gain curve #1 in red, gain curve #2, gain curve #3, gain curve #4, gain curve #5, gain curve #6, gain curve #7, and gain curve #8 in blue) correspond to eight different settings of the control signal, as illustrated in Table 1 below.

TABLE 1

(Gain Curves with Fixed High-frequency Zeros)

| Curve # (color) | High-frequency Zero Control Signal Logic Level | Low-frequency Zero Control Signal Logic Level | High-frequency Pole Control Signal Logic Level |
|---|---|---|---|
| 8 (red) | 0000 | 1111111 | 000 |
| 7 | 0000 | 0111111 | 000 |
| 6 | 0000 | 0011111 | 000 |
| 5 | 0000 | 0001111 | 000 |
| 4 | 0000 | 0000111 | 000 |
| 3 | 0000 | 0000011 | 000 |
| 2 | 0000 | 0000001 | 000 |
| 1 (blue) | 0000 | 0000000 | 000 |

As shown in Table 1, the high-frequency pole control signals 186, shown in the fourth column, are fixed (i.e., set as 000 in this example). In other words, the control signals 186 applied to the selectable path 150 at the collector/drain side, as shown in FIG. 3, are fixed for the eight gain curves. The position of the high-frequency poles, therefore, remains unchanged.

As shown in Table 1, the high-frequency zero control signals 182, shown in the second column, are fixed (i.e., set as 0000 in this example). In other words, the control signals 182 applied to the high-frequency zero portion 122 of the selectable path 120 at the emitter/source side, as shown in FIG. 2B, are fixed for the eight gain curves. The position of the high-frequency zeros, therefore, remains unchanged. As shown in FIG. 4, the eight gain curves cross each other at a crossing point (labeled as "P" in FIG. 4). The crossing point is located at about 10 GHz, and the corresponding S parameter is about 7 dB. The crossing of the eight gain curves at about 10 GHz provides a simple way to detect the variation in positions of the low-frequency zeros.

As shown in Table 1, the low-frequency zero control signals 184, shown in the third column, are varied (i.e., set as 0000000 for gain curve #1, set as 0000001 for gain curve #2, and so on). In other words, the control signals 184 applied to the low-frequency zero portion 124 of the selectable path 120 at the emitter/source side, as shown in FIG. 2C, are different for the eight gain curves. As a result, the RC time constant members 134a, 134b, . . . , 134g shown in FIG. 2A are connected one by one progressively, as the control signals 184 evolve from 0000000 to 1111111, through 0000001, 0000011, 0000111, 0001111, 0011111, and 0111111. The gain curve #1 represents the highest RC time constant, and the gain curve #8 represents the lowest RC time constant. The position of the low-frequency zeros, therefore, are able to be tuned accordingly. As shown in FIG. 4, the eight gain curves correspond to different positions of low-frequency zeros, and the slopes of the eight gain curves at the low-frequency region differ from each other, suggesting a robust selectivity. As mentioned above, since the position of the high-frequency zeros remains unchanged (i.e., the eight gain curves cross each other at the crossing point), the variation in positions of the low-frequency zeros alone can be used to distinguish these eight gain curves.

Figure 5:
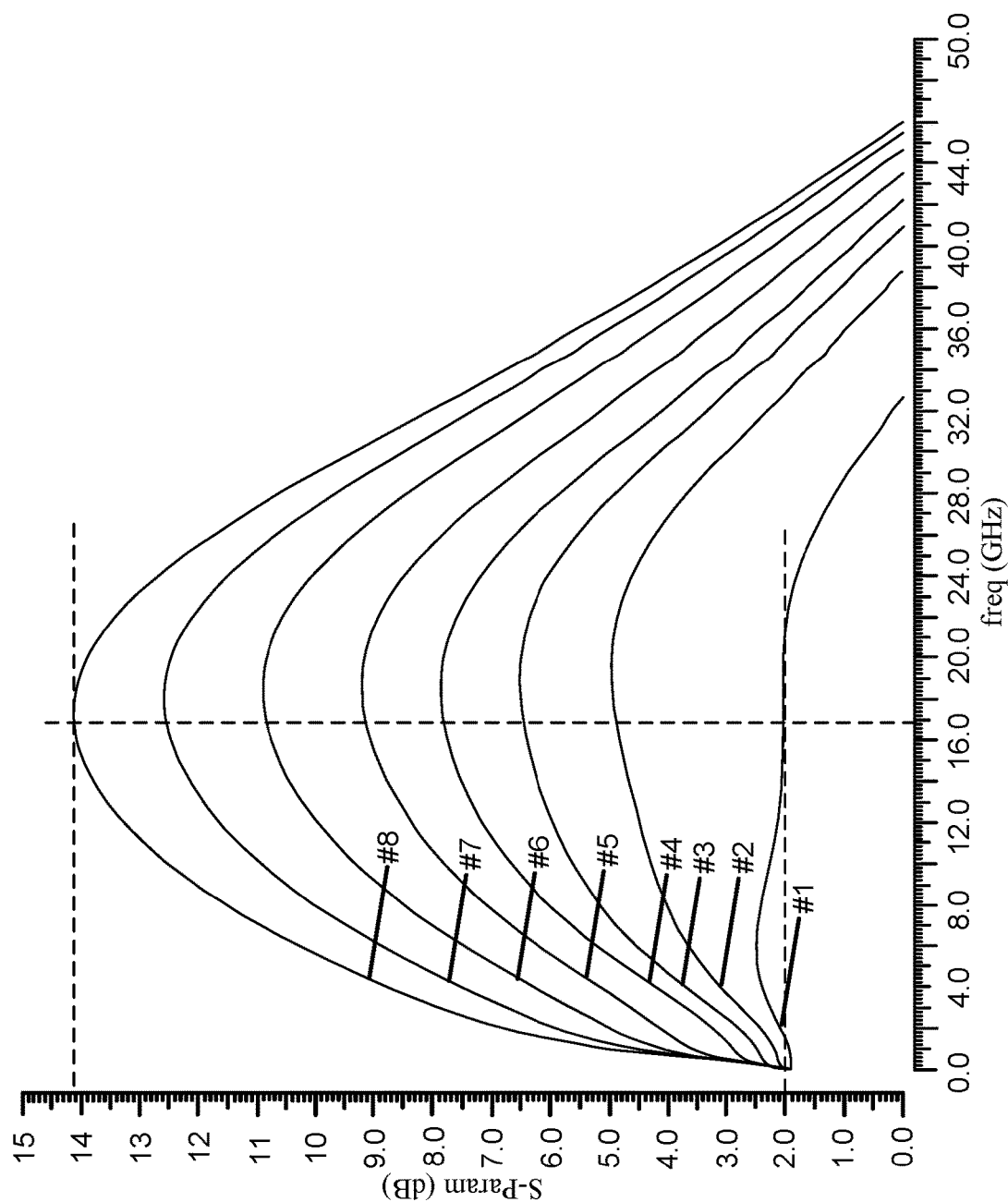
FIG. 5 shows the simulation of equalizer gain versus frequency with varied high-frequency zeros and varied low-frequency zeros according to an embodiment of the present invention.

FIG. 5 shows the simulation of equalizer gain versus frequency with varied high-frequency zeros and varied low-frequency zeros according to an embodiment of the present invention. As shown in FIG. 5, eight gain curves (i.e., gain curve #1 in aqua, gain curve #2, gain curve #3, gain curve #4, gain curve #5, gain curve #6, gain curve #7, and gain curve #8 in yellow) correspond to eight different settings of the control signal, as illustrated in Table 2 below.

TABLE 2

(Gain Curves with Varied High-frequency Zeros)

| Curve # (color) | High-frequency Zero Control Signal Logic Level | Low-frequency Zero Control Signal Logic Level | High-frequency Pole Control Signal Logic Level |
|---|---|---|---|
| 8 (yellow) | 1111 | 1111111 | 000 |
| 7 | 0111 | 0111111 | 000 |
| 6 | 0011 | 0011111 | 000 |
| 5 | 0001 | 0001111 | 000 |
| 4 | 0000 | 0000111 | 000 |
| 3 | 0000 | 0000011 | 100 |
| 2 | 0000 | 0000001 | 110 |
| 1 (aqua) | 0000 | 0000000 | 111 |

As shown in Table 2, the low-frequency zero control signals 184, shown in the third column, are varied (i.e., set as 0000000 for gain curve #1, set as 0000001 for gain curve #2, and so on). In other words, the control signals 184 applied to the low-frequency zero portion 124 of the selectable path 120 at the emitter/source side, as shown in FIG. 2C, are different for the eight gain curves. As a result, the RC time constant members 134a, 134b, . . . , 134g shown in FIG. 2A are connected one by one progressively, as the control signals 184 evolve from 0000 to 1111, through 0000001, 0000011, 0000111, 0001111, 0011111, and 0111111. The gain curve #1 represents the highest RC time constant, and the gain curve #8 represents the lowest RC time constant. The position of the low-frequency zeros, therefore, are able to be tuned accordingly.

However, unlike in the example shown in FIG. 4, the high-frequency zero control signals 182, shown in the second column, are varied in the example shown in FIG. 5. In other words, the control signals 182 applied to the high-frequency zero portion 122 of the selectable path 120 at the emitter/source side, as shown in FIG. 2B, are varied for the eight gain curves. As a result, the RC time constant members 132a, 132b, 132c, and 132d shown in FIG. 2A are connected between the terminal A and the terminal B accordingly, as the control signals 182 evolve from 0000 to 1111, through 0001, 0011, and 0111.

Unlike in the example shown in FIG. 4, the high-frequency pole control signals 186, shown in the fourth column, are varied in the example shown in FIG. 5. In other words, the control signals 186 applied to the selectable path 150 at the collector/drain side, as shown in FIG. 3, are varied for the eight gain curves. The positions of the high-frequency poles, therefore, are tuned accordingly. It should be noted that the positions of the high-frequency poles are tuned for gain curves #1, #2, #3, and #4 since they share the same position of the high-frequency zeros due to the same control signal setting (i.e., 0000). Thus, these four gain curves #1, #2, #3, and #4 can be further distinguished despite the identical position of the high-frequency zeros. By adjusting the positions of the high-frequency poles, the gain curves can be fine-tuned to facilitate better manipulation of the locations of the low-frequency zeros at the low-frequency region. For example, a relatively low gain (i.e., about 2 dB in the example shown in FIG. 5) can be achieved for gain curve #1 because of the adjustment of the positions of the high-frequency poles.

Therefore, as shown in Table 2 and explained above, tuning the positions of the high-frequency zeros, the positions of the low-frequency zeros, and the positions of the high-frequency poles allow for latitude to achieve a relatively wide gain range at a desired frequency (e.g., about 17 GHz, as shown by the dashed line in FIG. 5) or a desired frequency band (e.g., between about 16 GHz and about 18 GHz). A wider gain range means a stronger capability of compensating for the insertion loss by the equalizer of the linear redriver. For example, when the desired or target frequency is about 17 GHZ, the gain range is between about 2 dB (for the gain curve #1) and about 14 dB (for the gain curve #8). Upon knowing the desired or target frequency, a user can tune the positions of the high-frequency zeros, the positions of the low-frequency zeros, and the positions of the high-frequency poles to achieve the relatively wide gain range.

Figure 6:
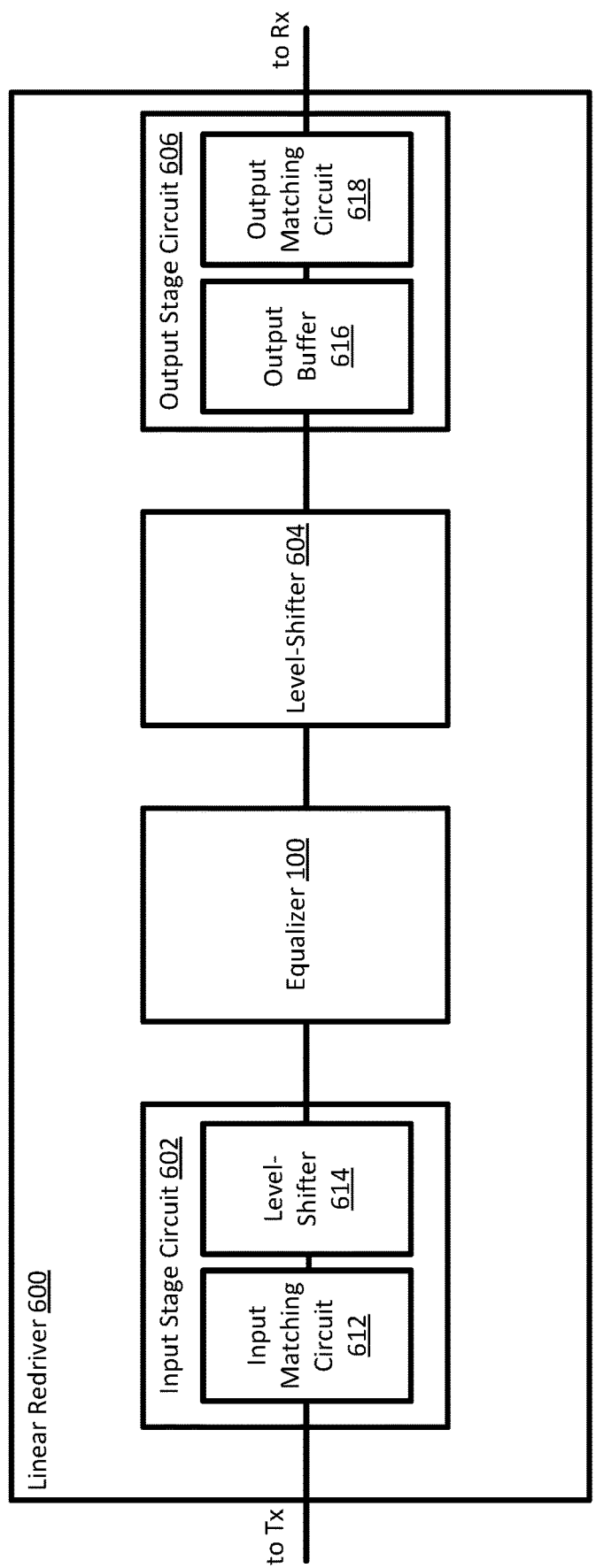
FIG. 6 shows a redriver that includes the equalizer stage circuit according to an embodiment of the present invention.

FIG. 6 shows a redriver that includes the equalizer stage circuit according to an embodiment of the present invention. The linear redriver 600 is connected between the transmitter Tx and the receiver Rx. In the example shown in FIG. 6, the linear redriver 600 includes, among other components, an input stage circuit 602, an equalizer 100 (e.g., the equalizer 100 shown in FIG. 1), a level-shifter 604, and an output stage circuit 606. It should be understood that this example is not intended to be limiting, and the linear redriver 600 may include other components as needed in other embodiments.

The input terminal of the input stage circuit 602 is connected to the transmitter Tx. The input stage circuit 602 includes, among other components, an input matching circuit 612 (e.g., a T-coil), an input 50-ohm termination to reference voltage, and a level-shifter 614 (e.g., an emitter follower) to provide a voltage level shift from the reference voltage at the input to an internal bias voltage level. The output terminals of the level-shifter 612 are connected to the input terminals (e.g., the base 193 of the first transistor 112 and the base 197 of the second transistor 114, as shown in FIG. 1) of the equalizer 100. The output terminals (e.g., the terminal E and the terminal F, as shown in FIG. 1) of the equalizer 100 are connected to the level-shifter 604 to set up the bias voltage level for the output stage circuit 606 (specifically, the output buffer 616 of the output stage circuit 606). The output stage circuit 606 includes, among other components, the output buffer 616 and the output matching circuit 618. The output buffer 616 is configured with control circuitry to tune the flat gain of the liner redriver 600 and the linear swing control for adjusting the degree of linearity. The output from output buffer 616 is connected to an output 50-ohm termination to reference voltage through the output matching circuit 618. The output of the output stage circuit 606 is connected to the receiver Rx.

It is understood that the examples and embodiments described herein are for illustrative purpose only and that various modifications or changes in light thereof will be suggested to persons skilled in the art and are to be included within the spirit and purview of this application and scope of the appended claims.

What is claimed is:

1. An equalizer stage circuit, comprising:
a first transistor;
a second transistor, wherein the first transistor and the second transistor are disposed in a differential configuration; and
a first selectable path comprising:
a first terminal coupled to an emitter or a source of the first transistor;
a second terminal coupled to an emitter or a source of the second transistor;
a high-frequency portion comprising a first plurality of high-frequency resistor-capacitor (RC) time constant members connected in parallel between the first terminal and the second terminal;
a first capacitor coupled to the first terminal;
a second capacitor coupled to the second terminal; and
a low-frequency portion comprising a second plurality of low-frequency RC time constant members connected between the first capacitor and the second capacitor.

2. The equalizer stage circuit of claim 1, wherein each of the first plurality of high-frequency RC time constant members is selectively coupled between the first terminal and the second terminal based on a first set of control signals.

3. The equalizer stage circuit of claim 2, wherein the high-frequency portion is characterized by a first varying impedance based on the first set of control signals.

4. The equalizer stage circuit of claim 3, wherein the first varying impedance determines a position of a high-frequency zero of a transfer function.

5. The equalizer stage circuit of claim 1, wherein each of the second plurality of low-frequency RC time constant members is selectively coupled between the first capacitor and the second capacitor based on a second set of control signals.

6. The equalizer stage circuit of claim 5, wherein the low-frequency portion is characterized by a second varying impedance based on the second set of control signals.

7. The equalizer stage circuit of claim 6, wherein the second varying impedance determines a position of a low-frequency zero of a transfer function.

8. The equalizer stage circuit of claim 5, wherein each of the second plurality of low-frequency RC time constant members comprises:
a first resistor connected to the first capacitor;
a second resistor connected to the second capacitor;
a first access transistor connected between the first resistor and a ground; and
a second access transistor connected between the second resistor and the ground.

9. The equalizer stage circuit of claim 8, further comprising a control unit configured to apply the second set of control signals to a gate of the first access transistor and a gate of the second access transistor of the second plurality of low-frequency RC time constant members.

10. The equalizer stage circuit of claim 1, further comprising:
a second selectable path comprising:
a third terminal coupled to a collector or a drain of the first transistor;
a fourth terminal coupled to a collector or a drain of the second transistor; and
a third plurality of high-frequency RC time constant members connected between the third terminal and the fourth terminal.

11. The equalizer stage circuit of claim 10, wherein each of the third plurality of high-frequency RC time constant members is selectively coupled between the third terminal and the fourth terminal based on a third set of control signals.

12. The equalizer stage circuit of claim 11, wherein the second selectable path is characterized by a third varying impedance based on the third set of control signals.

13. The equalizer stage circuit of claim 12, wherein the third varying impedance determines a position of a high-frequency pole of a transfer function.

14. A linear redriver coupled between a transmitter and a receiver, the linear redriver comprising:
an input stage circuit coupled to the transmitter;
an output stage circuit coupled to the receiver; and
an equalizer stage circuit coupled between the input stage circuit and the output stage circuit, the equalizer stage circuit comprising:
a first transistor;
a second transistor, wherein the first transistor and the second transistor are disposed in a differential configuration; and
a first selectable path comprising:
a first terminal coupled to an emitter or a source of the first transistor;
a second terminal coupled to an emitter or a source of the second transistor;
a high-frequency portion comprising a first plurality of high-frequency resistor-capacitor (RC) time constant members connected in parallel between the first terminal and the second terminal;
a first capacitor coupled to the first terminal;
a second capacitor coupled to the second terminal; and
a low-frequency portion comprising a second plurality of low-frequency RC time constant members connected between the first capacitor and the second capacitor.

15. The equalizer stage circuit of claim 14, wherein each of the first plurality of high-frequency RC time constant members is selectively coupled between the first terminal and the second terminal based on a first set of control signals.

16. The equalizer stage circuit of claim 15, wherein the high-frequency portion is characterized by a first varying impedance based on the first set of control signals.

17. The equalizer stage circuit of claim 16, wherein the first varying impedance determines a position of a high-frequency zero of a transfer function.

18. The equalizer stage circuit of claim 14, wherein each of the second plurality of low-frequency RC time constant members is selectively coupled between the first capacitor and the second capacitor based on a second set of control signals.

19. The equalizer stage circuit of claim 18, wherein the low-frequency portion is characterized by a second varying impedance based on the second set of control signals.

20. The equalizer stage circuit of claim 19, wherein the second varying impedance determines a position of a low-frequency zero of a transfer function.

* * * * *